May 24, 1966   C. A. A. DE WAGTER   3,252,499
IGNITION DEVICE FOR OIL HEATERS
Filed March 30, 1965   3 Sheets-Sheet 1
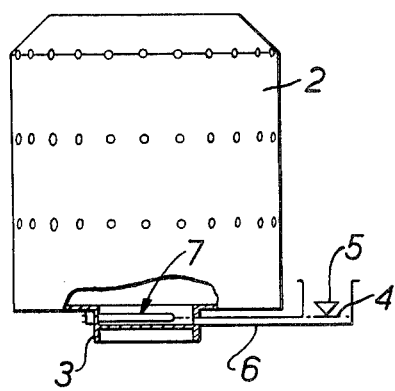
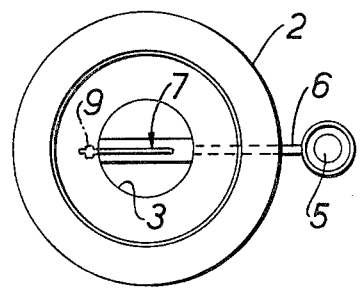
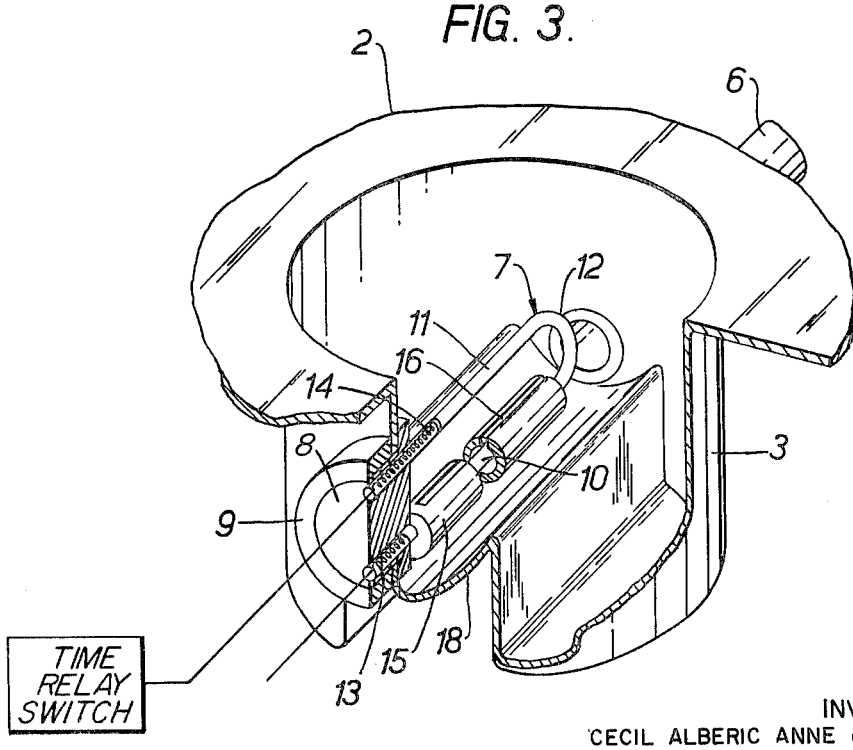
INVENTOR.
CECIL ALBERIC ANNE de WAGTER
BY
MORGAN, FINNEGAN, DURHAM & PINE
ATTORNEYS

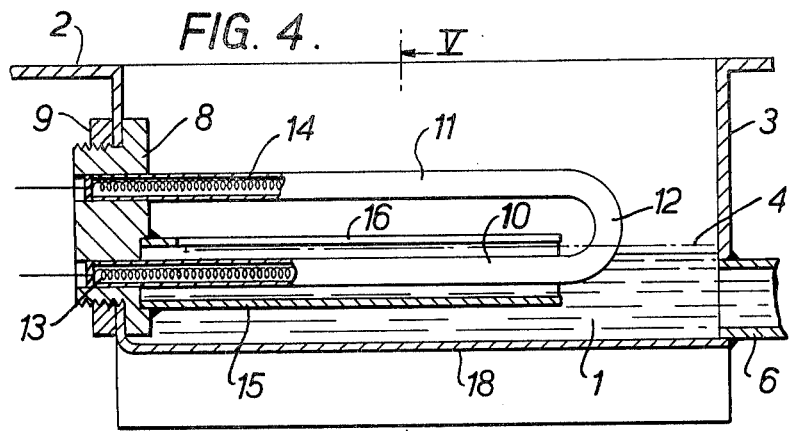
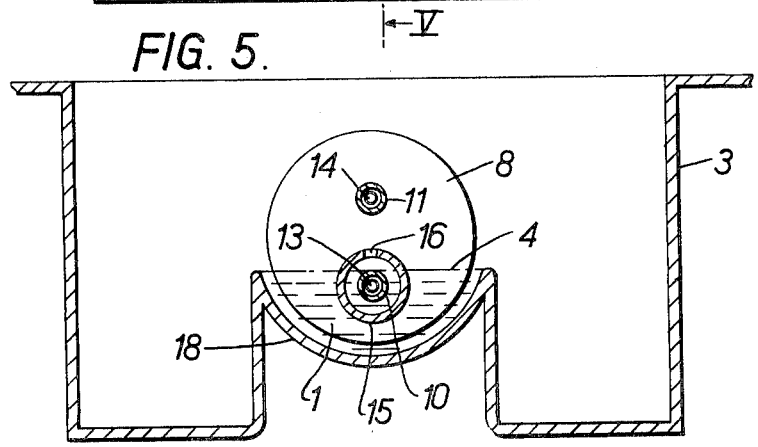
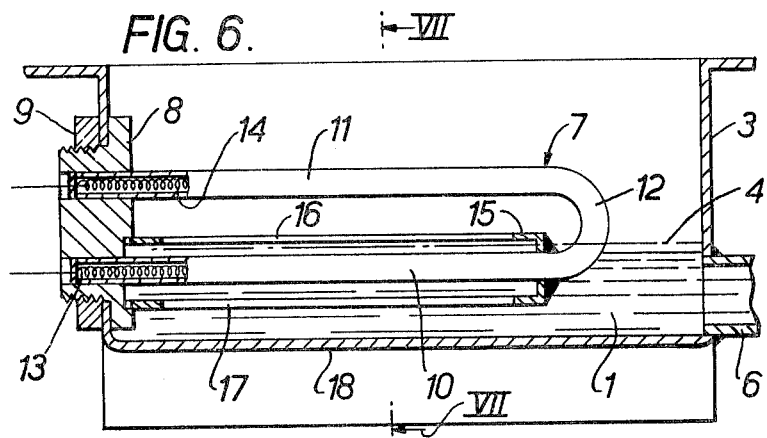

May 24, 1966  C. A. A. DE WAGTER  3,252,499
IGNITION DEVICE FOR OIL HEATERS
Filed March 30, 1965  3 Sheets-Sheet 3
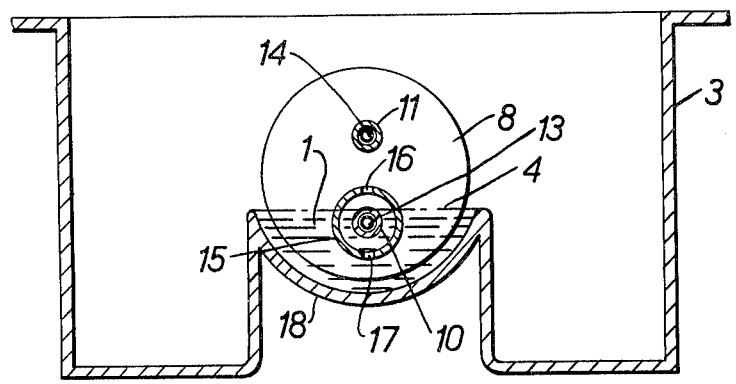
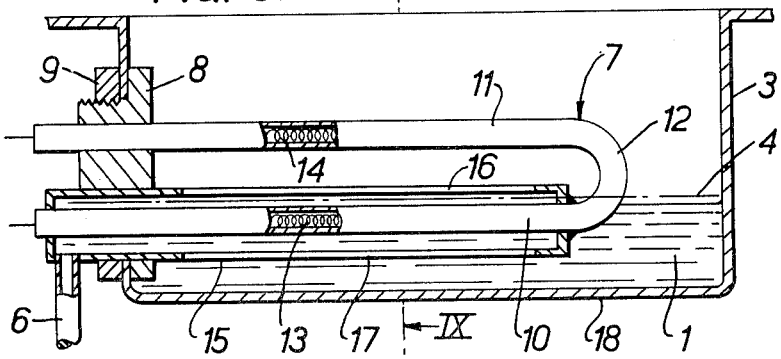
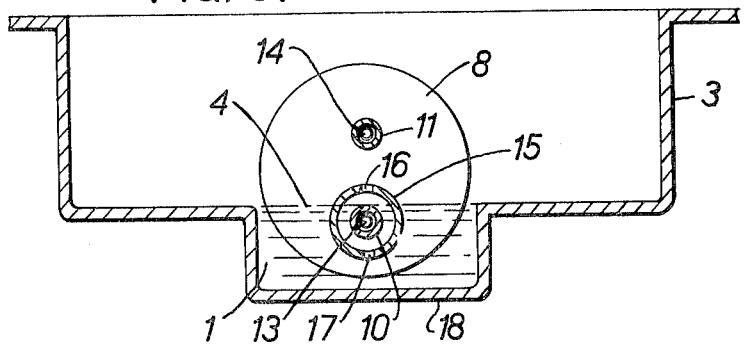
INVENTOR.
CECIL ALBERIC ANNE de WAGTER
BY
MORGAN, FINNEGAN, DURHAM & PINE
ATTORNEYS

United States Patent Office 3,252,499
Patented May 24, 1966

3,252,499
IGNITION DEVICE FOR OIL HEATERS
Cecil Alberic Anne De Wagter, Brabant, Belgium, assignor to The British Petroleum Company Limited, London, England, a company of England
Filed Mar. 30, 1965, Ser. No. 443,823
Claims priority, application Belgium, Oct. 2, 1964, 3,673, Patent 653,855
6 Claims. (Cl. 158—91)

The present invention relates to a method and a device for igniting a liquid fuel in a burner of the vaporising type. Such a burner includes in particular a cup into which the liquid fuel is introduced up to a suitable level. A part of the liquid fuel thus entering the cup is heated by means of a vaporising element so as to be partially vaporised and the mixture of the vapour produced with combustion air is lit by means of an igniting element so as to ensure ignition of the fuel in the burner.

According to procedures already known and with the conventional devices, the liquid fuel contained in the cup is heated by means of a heating element acting on the outside of the cup or inside it, in or above the mass of the fuel.

Thus, in certain cases, this heating element consists of an electrical resistance arranged under the bottom of the cup where the liquid fuel is heated by conduction of heat through the walls of the cup.

In other cases, the heating element is mounted inside the cup. This element can be placed above the liquid fuel contained in the cup so as to heat the fuel by radiation. The element may, however, also be immersed in the liquid fuel to heat it directly.

Automatic devices exist for igniting vapour coming from heated liquid fuels. These usually necessitate delicate electro-mechanical components which are inserted in complicated electrical circuits. Moreover, such particularly expensive measures are only applied to heating apparatus fitted with a vaporising burner having a large heating capacity and consequently a high price. Such apparatus is not applicable to relatively small domestic boilers equipped with a similar type of burner.

Automatic ignition of a liquid fuel in vaporising burners requires a large equipment investment owing to difficulties in progressive admission of the fuel into the burners and in controlling the ignition by thermal or optical means with all the necessary high tenison and low tension equipment.

Further, certain electrical ignition devices for liquid fuel in a vaporising burner are placed in the zone of the flame, and have the disadvantage of oxidising rapidly at high temperatures and thus having a relatively short service life.

Finally, certain vaporising burners with closed cup are inaccessible from outside and are particularly difficult to light by means of a flame.

In order to remedy the above disadvantages, a new method and a new device are used so as to obtain rapid and certain ignition of the fuel in the cup.

According to the present invention a device for igniting liquid fuel in the cup of a vaporising type burner comprise a vaporising element mounted in a sheath adapted to be arranged in the cup and outside the oxidation zone of the flame, the vaporising element being adapted to be brought to a temperature which is relatively low but sufficient to ensure vaporisation of fuel introduced into the sheath, and means for guiding vaporised fuel and combustion air to an igniting element mounted inside the cup and adapted to be brought to a relatively high temperature sufficient to ignite the vapour/air mixture.

The vaporising element is preferably a lower heating tube while the ignition element is an upper heating tube.

The heating tubes are advantageously arranged in the neighborhood of the level of the fuel contained in the cup.

According to one feature of the invention, the heating tubes are in the form of a U tube, the loop of which is inside the cup of the vaporising burner.

According to another feature of the invention, the heating tubes include electrical resistances which can be connected in series so that they heat simultaneously. These resistances can, moreover, be supplied with advantage at the normal voltage of a town distribution system.

According to other features of the invention, the heating tubes constitute the secondary circuit of an electric transformer or are heated by induction of high frequency.

According to yet another feature of the invention, the sheath is in the form of a tube which surrounds the vaporising element, i.e. the lower heating tube, and which has at least one side or bottom passage through which the liquid fuel can enter and at least one top passage through which the combustion mixture of air and vapour can be guided to the ignition element, i.e. the upper heating tube. This feature enables the sheath to guide the mixture directly without introducing another deflecting component.

In order to facilitate good operation of the fuel ignition, the ignition device includes with advantage a time relay (for example a thermal type) enabling the heating elements of the heating tubes to be switched on for a predetermined period of time, corresponding to the capacity of the vaporising burner.

According to a further advantageous feature of the invention, the liquid fuel is admitted into the cup, through the sheath, along the vaporising element, i.e. along the lower heating tube. In this way, on each ignition the solid carbon deposit is eliminated which forms at the exit of the supply pipe of the cup during normal operation of the burner.

The invention includes a burner of the vaporising type incorporating an ignition devices as described hereinabove.

Other details and features of the invention will appear during the course of the description of the accompanying drawings which represent, diagrammatically, three forms of carrying out the device according to the invention.

FIG. 1 is an elevation view with part section of a vaporising burner equipped with the first form of carrying out the ignition device according to the invention.

FIG. 2 is a plan view of the burner and device as per FIG. 1.

FIG. 3 is a perspective view, with part section, of the ignition device of the burner shown in the previous figures.

FIG. 4 is a detailed vertical section of the new ignition device fitted to this burner.

FIG. 5 is a transverse section of this device, on the line V—V of FIG. 4.

FIG. 6 is a similar vertical section of the second form of carrying out the new ignition device.

FIG. 7 is a similar transverse section on the line VII—VII of FIG. 6.

FIG. 8 is a similar vertical section of the third form of carrying out the new ignition device.

FIG. 9 is a transverse section of the third device, this section being taken on line IX—IX of FIG. 8.

In these different figures, the same reference notations have been used to designate identical elements.

The ignition devices shown serve to ignite a liquid fuel such as gas-oil used in a vaporising burner 2 of a heating apparatus which is, for example, in domestic use.

The vaporising burner 2 includes in particular a cup 3 which receives the gas-oil 1 at a certain fixed rate so that after a certain time this gas-oil 1 reaches a suitable ignition level 4 determined by the maximum flow of a flow regulator 5.

The gas-oil feed to the cup 3 is made, in a known way, through an inlet pipe 6.

Each ignition device includes a U tube 7 which is mounted on a removable support 8 fixed to the wall of the burner. For this purpose, the support 8 has for example a threaded part on which is screwed a securing nut 9. Other means of fixing the tube 7 on the wall of the burner can of course be employed.

The U tube 7 is arranged mostly inside the cup 3 in which it consists of a lower branch forming a lower heating tube 10, an upper branch forming an upper heating tube 11 and a loop 12 connecting the two branches.

Heating tubes 10 and 11 are located partly below and partly above the ignition level 4 of the gas-oil 1. They are placed parallel to this level and in the neighbourhood of it. Thus the lower tube 10 is immersed in the gas-oil 1 while the upper tube 11 is not.

Tubes 10 and 11 are actual heating elements, containing for example electrical resistances 13 and 14 which are respectively arranged in the U tube 7 and electrically insulated from it.

The lower resistance 13 is of low heating power. For example, its coils are relatively widely spaced from one another. This resistance 13 extends through the lower tube 10.

The upper resistance 14 is of high heating power. This resistance 14 extends through the upper tube 11.

The ends of resistances 13 and 14, inside the loop 12, are welded together. The other ends of these resistances, outside the U tube 7, form two terminals to which a normal distribution system can be connected.

The time during which the heating current passes through these resistances 13 and 14 connected in series is limited by a time relay (a thermal type for example) not shown, in spite of any improper intervention of the user. This time is predetermined by the nominal capacity of the vaporising burner and therefore by the speed of admission of the gas oil 1 into the cup 3 through the inlet pipe 6.

The lower tube 10 serves to heat moderately and locally the liquid gas oil 1 surrounding it. By dissipating a certain electrical energy in the resistance 13, the lower tube 10 is brought up to a temperature relatively low but sufficient to vaporise the gas oil. Thus the heating of the lower tube 10 causes the more volatile constituents of the gas oil to vaporise and collect in the tubular sheath 15. The latter surrounds the lower tube 10 and extends practically over its whole internal length. It is placed partly below and partly above the level of the liquid gas oil. It has at least one opening on top through which passes a mixture of the vapour produced and combustion air above the said level 4, and also has at least one opening at the bottom or side through which the liquid gas oil 1 passes into the sheath.

Above the level 4, the gas oil vapour thus obtained is mixed with the combustion air to be found in the sheath 15. This gas mixture circulates upwards through the top opening and meets the upper tube 11 in its path.

The upper tube 11 is brought up to a relatively high temperature sufficient to set alight the said mixture and to ensure the ignition of the gas oil contained in the cup 3.

The forms shown for realising the invention differ in the construction of the guiding sheath 15 and in the part which it plays.

Thus in the first form, the sheath 17 is a tube opened upwards by a longitudinal slot 16 which forms its top opening, and opened laterally by its unclosed internal end which forms its lateral opening.

On the other hand, in the other two forms the sheath 15 is also a tube with the above slot 16 as top opening but with a bottom slot 17 diametrically opposite to the slot 16 as bottom opening, the internal end of the tube being this time partially closed in the gas oil 1 up to level 4.

In the first two forms, the sheath 15 serves to limit the quantity of liquid gas oil to be vaporised and to guide the mixture of combustion air and gas oil vapour produced towards the upper tube 11.

In the third form, however, the sheath 15 serves to bring the liquid gas oil 1 into the cup 3.

By means of one or other of the new ignition devices described above, a new ignition process for the gas oil 1 can be applied.

In this process a part of the liquid gas oil 1 is heated moderately and locally inside the sheath 15 by means of the lower tube 10. This heating can be carried out before, during or after admitting the gas oil into the cup. For this purpose the lower tube 10 is brought up to a temperature relatively low but sufficient to vaporise the gas oil surrounding it by passing an electric current through resistance 13.

Then the mixture of gas oil vapour produced and combustion air found in the sheath 15 is guided by means of the sheath through its upper slot 16.

By passing electric current through resistance 13 and consequently through resistance 14, the upper tube 11 is heated at the same time as the lower tube 10. Owing to the high heating power of resistance 14, the upper tube 11 is brought up to a comparatively high temperature sufficient to ignite the said mixture. Thus progressive ignition of the gas oil 1 contained in cup 3 is produced.

It should be noted that in the forms shown, the cup 3 has a longitudinal trough 18 extending underneath the sheath 15. The longitudinal sides of this trough reach up to level 4 of the gas oil in cup 3, and the object of the trough is to limit the quantity of gas oil to be evaporated for producing ignition of that contained in the whole cup 3. This trough 18 is not used in the third form.

The construction of the sheath 15 can be different from that described above. Thus slot 16 and/or slot 17 can be replaced by a series of perforations, for example a line of round holes. On the other hand the sheath itself can be made as a wire mesh tube of the miner's lamp type.

In the cases described above, the vaporising element is immersed in the gas oil and heats it by direct convection. However, this element can also be arranged above level 4 of the gas oil and heat it by radiation.

The heating tubes 10 and 11 are brought up to the required temperature by electrical resistances 13 and 14. These heating tubes may form the secondary circuit of an electrical transformer e.g. an L.T. transformer. Alternatively they may be heated by induction at high frequency.

One or other of the ignition devices described above can with advantage be combined with a temperature regulating thermostat at the place to be heated, a solenoid valve located at the outlet of a level regulator, and another time relay so as to permit completely automatic heating of the vaporising burner on the "on/off" principle.

It is clear that the invention is not exclusively limited to the practical forms shown, and that modifications can be made in the form, arrangement and constitution of certain elements entering into their design, on conditions that these modifications are not contrary to the object of each of the following claims.

I claim:

1. In a heater of the type including a vaporizing pot type liquid fuel burner wherein the liquid fuel is introduced to a cup member and maintained at a substantially constant predetermined level, an electrical ignition device comprising: a vaporizing element and an ignition element positioned in spaced alignment in a substantially vertical plane, said ignition and vaporizing elements provided in the form of upper and lower heating tubes, respectively, each of said heating tubes including an electrical resistance element, said upper heating tube positioned above, and said lower heating tube positioned below, the level of the liquid fuel admitted to the cup member of the burner, and a tubular sheath member surrounding said lower heating tube, a portion of said sheath member extending above the level of said liquid fuel, said sheath member having a first opening therein located beneath the level of said liquid fuel so as to permit liquid fuel to pass therethrough and a second opening therein located above the level of said liquid fuel for guiding vaporized fuel and combustion air toward said ignition element.

2. The combination as claimed in claim 1 wherein said upper and lower heating tubes comprise the legs of a U-tube, and wherein the electrical resistance element of said lower heating tube is of low heating power and the electrical resistance element of said upper heating tube is of high heating power.

3. The combination as claimed in claim 1, wherein said first and second openings in said sheath member comprise diametrically opposed longitudinal slots, the ends of said sheath member being closed.

4. The combination as claimed in claim 1, wherein said first opening in said sheath member is formed by opening at least one end of said sheath.

5. The combination as claimed in claim 1, wherein said sheath member includes liquid fuel inlet means.

6. The combination as claimed in claim 1, wherein a time relay is included, allowing the vaporizing and ignition elements to be energized for a predetermined interval of time.

References Cited by the Examiner

UNITED STATES PATENTS

| | | | |
|---|---|---|---|
| 1,479,905 | 1/1924 | Fekete. | |
| 1,670,819 | 5/1928 | Morris et al. | 158—280 |
| 2,448,142 | 8/1948 | Fell et al. | 158—91 |
| 2,775,966 | 1/1957 | Huntley | 158—91 X |
| 2,966,943 | 1/1961 | Breese | 158—91 |
| 3,017,921 | 1/1962 | Stierlin | 158—91 X |

JAMES W. WESTHAVER, *Primary Examiner.*